March 16, 1965 W. F. PETERS 3,173,436
COLLAPSIBLE ICE FISHING SHELTER
Filed May 4, 1962 2 Sheets-Sheet 1
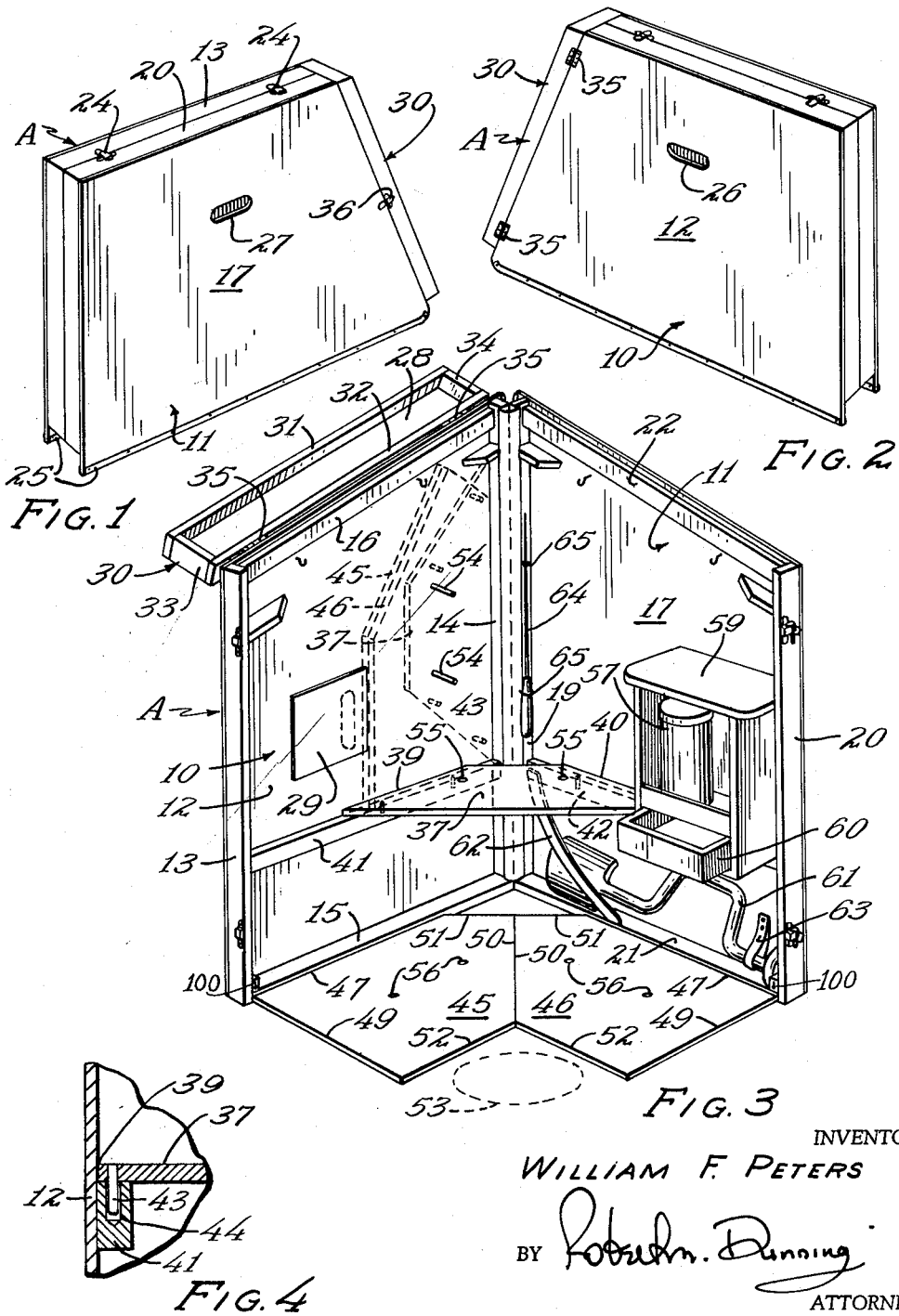
INVENTOR
WILLIAM F. PETERS
BY
ATTORNEY March 16, 1965  W. F. PETERS  3,173,436
COLLAPSIBLE ICE FISHING SHELTER
Filed May 4, 1962  2 Sheets-Sheet 2
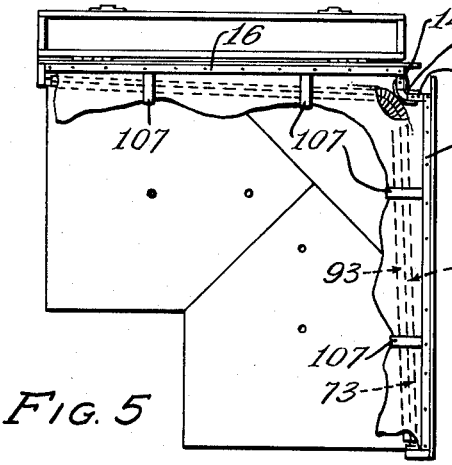
FIG. 5
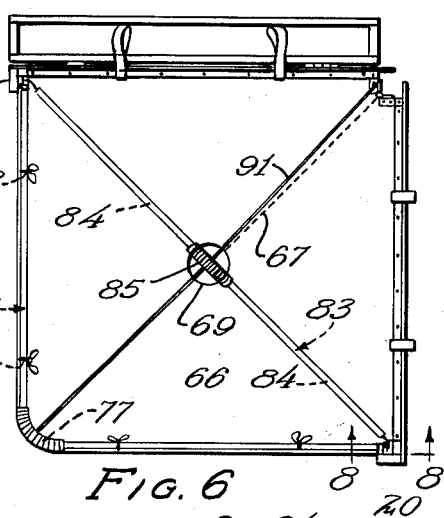
FIG. 6
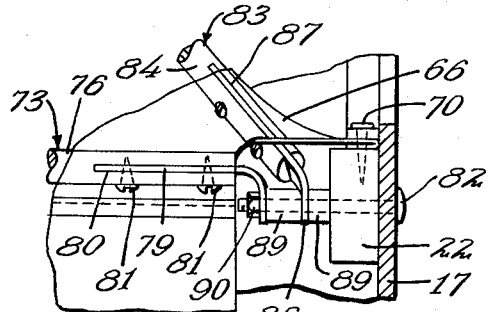
FIG. 8
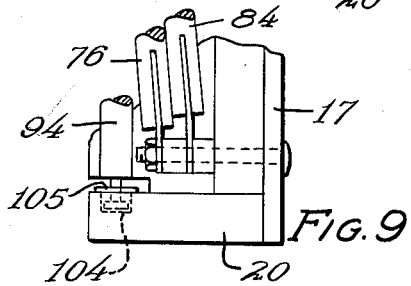
FIG. 9
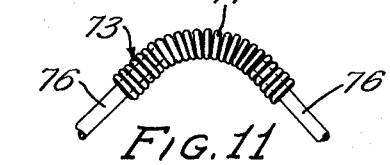
FIG. 11
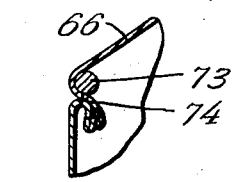
FIG. 10
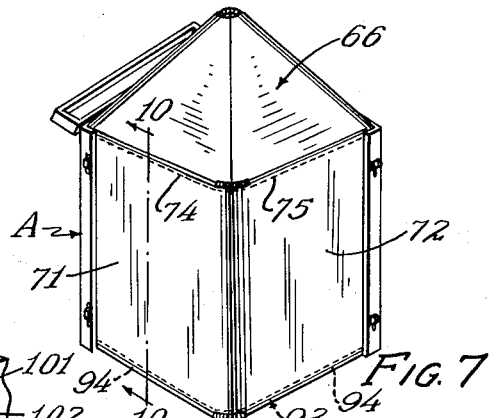
FIG. 7
FIG. 12
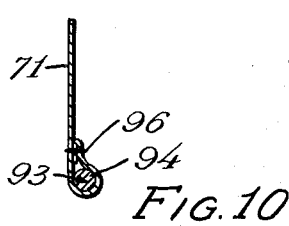
INVENTOR
WILLIAM F. PETERS
BY Robert M. Dunning
ATTORNEY

United States Patent Office 3,173,436
Patented Mar. 16, 1965

3,173,436
COLLAPSIBLE ICE FISHING SHELTER
William F. Peters, Box 202, Inver Grove, Minn.
Filed May 4, 1962, Ser. No. 192,536
10 Claims. (Cl. 135—5)

This invention relates to an improvement in collapsible ice fishing shelter and deals particularly with a generally rectangular shelter which may be folded up in the manner of a suitcase to contain the various equipment necessary for ice fishing.

With the rapid growth in the popularity of ice fishing, the demand for ice fishing shelters has greatly increased. Some persons have built sectional fish houses of quite considerable size which may be taken out of the ice in sections and put together, but usually this involves considerable time and effort, and the resultant shelter is not particularly portable at least over any substantial distance. Furthermore, due to the weight of such shelters, it is usually necessary to erect them after the ice has been thick enough to support the weight of an automobile in order to avoid the necessity of carrying the various sections to the proper location. In most instances, shelters of this type are erected as soon as the ice is thick enough and remain in place until spring. If the disassembly of the houses is delayed too long, it is often impossible to recover them without danger of breaking through the ice. It is a purpose of the present invention to provide an ice shelter which is readily portable and which may be assembled and disassembled in a very short period of time. Due to its ready portability, the shelter may be assembled on each fishing trip and disassembled and taken home at the completion of each fishing trip.

A feature of the present invention lies in the provision of a fishing shelter provided with two rigid walls made of thin plywood or similar material having an inner box-like frame so that each of the two walls comprises a shallow traylike member designed to accommodate the various sections of the shelter, and the ice fishing equipment when the two sections are in opposed abutting relation. The frames of the two sections are hingedly connected so as to fold from opposed abutting relation to right angular relationship. The remaining two walls of the shelter, as well as the top of the shelter, are formed by a flexible plastic sheet which is preferably transparent or translucent to admit light to the interior. A generally triangular seat is provided which fits in the juncture between the two sections when they are folded into right angular relation, and a pair of floor panels are provided which may rest upon the surface of the ice to keep the feet of the fishermen from the cold surface of the ice. The floor panels are so arranged as to define an opening in the corner of the shelter opposite the seat, exposing a portion of the ice so that the hole may be drilled through the ice at this point, and the fishermen may fish through the hole within the confines of the shelter.

A further feature of the present invention resides in the provision of an ice fishing shelter including a pair of hollow sections which may be folded into edge abutting relation to contain the remaining elements of the shelter and the equipment, and in equipping the hinged edges of the sections with metal runners which swing into parallel relation when the sections are closed. With this arrangement, when the shelter is collapsed and closed, it may be moved along the surface of the ice on its runners and need only be lifted from the edge of the ice to the car or to a suitable storage place.

A further feature of the present invention resides in the provision of light weight metal frames which are connected to the sections and which extend therefrom in a manner to support the plastic sheeting which forms the two walls and top of the enclosure.

These and other objects and novel features of the present invention will be more clearly and fully set forth in the following specification and claims.

In the drawings forming a part of the specification;

FIGURE 1 is a perspective view of one side of the portable shelter in collapsed form.

FIGURE 2 is a perspective view of the other side of the collapsed shelter from that illustrated in FIGURE 1.

FIGURE 3 is a perspective view of the shelter in erected form with the flexible covering forming the top and two sides removed.

FIGURE 4 is a sectional detail showing the manner in which the seat is detachably supported.

FIGURE 5 is a top plan view of the erected shelter with a portion of the flexible covering broken away.

FIGURE 6 is a top plan view of the erected shelter.

FIGURE 7 is a perspective view of the erected and closed shelter.

FIGURE 8 is a vertical sectional view through a detailed portion of the shelter, the position of the section being indicated by the line 8—8 of FIGURE 6.

FIGURE 9 is a top plan view of a corner portion of the shelter with the flexible covering removed.

FIGURE 10 is a sectional view of a detailed portion of the covering and its support, the position of the section being indicated by the line 10—10 of FIGURE 7.

FIGURE 11 is a detail view showing the connection between the flexible covering support.

FIGURE 12 is a perspective view of the detachable connection for the lower portion of the flexible covering.

The shelter A includes a pair of trapezoidal sections 10 and 11 which are hingedly connected together. The section 10 includes a trapezoidal panel 12 of plywood or similar material having a frame strip 13 extending along one edge, a frame strip 14 extending along the opposite parallel edge, and a frame strip 15 connecting the frame strips 13 and 14 along the bottom edge of the panel when the shelter is erected. The frame strip 15 is at right angles to the strips 13 and 14. A brace 16 extends along the upper inclined edge of the panel 12, this brace 16 being of lesser thickness than the frame strips 13, 14, and 15. The panel 12 extends slightly beyond the longer parallel frame strip 14 for a purpose which will be later described.

The section 11 is similarly formed with a trapezoidal panel 17 having parallel frame strips 19 and 20 extending vertically along the parallel edges of the panel, and having a connecting frame strip 21 between the lower ends of the strips 19 and 20. The panel 17 extends slightly beyond the frame strip 19 as will be later disclosed. A brace 22 of lesser thickness than the frame strips 19 and 20 and 21 extends along the upper inclined edge of the panel 17. In describing the edges as being vertical or horizontal, it should be understood that this description refers to the shelter in erected form rather than in collapsed form.

Hinges such as 23 (FIGURE 5) connect the frame strip 14 of section 10 with the frame strip 19 of section 11 so that the two sections may fold from right angular relation as indicated in FIGURES 3, 5, and 6 of the drawings to a position in which the frame strips of the two sections abut. Detachable fasteners 24 of any suitable type include cooperable portions on the frame strips 13 and 20 of the two sections so as to hold the two sections in the collapsed position illustrated in FIGURES 1 and 2. Metal runners 25 are connected to the portions of the panels 12 and 17 which project beyond the frame strips 14 and 19 respectively so that the collapsed shelter may be moved readily over the ice and snow. Hand holes 26 and 27 are provided in the panels 12 and 17 respectively, these hand holes being covered at their inner end by a resilient panel such as 29, one of which is illustrated in FIGURE 3 of the drawings. The hand holes permit the insertion of the fingers for handling the shelter, particularly in collapsed form, and at the same time are closed against the passage of air when the shelter is erected. An end closure 30 is designed to form a closure for the four sides of the panels 12 and 17 when the shelter is collapsed. The end closure 30 is box shape in form and including a closure panel 28 to which are attached parallel side members 31 and 32 and parallel end members 33 and 34. The side member 32 is hinged to the upper edge of the panel 12 with hinges 35, the end closure being foldable through approximately one hundred eighty degrees from the open position illustrated in FIGURE 3 to the closed position illustrated in FIGURES 1 and 2. A cooperable fastener 36 connects the panel 17 to the enclosure 30 when the enclosure 30 is in closed position.

A generally triangular seat 37 includes diagonally extending ends 39 and 40 designed to abut against the panels 12 and 17 respectively when the shelter is erected. A brace 41 is secured to the inner surface of the panel 12 between the frame strips 13 and 14 at a point spaced from the bottom of the panels, and a similar frame strip 42 extends across the panel 17 between the frame strips 19 and 20 at a similar elevation to that of the brace 41. The end edges 39 and 40 of the seat rest upon the braces 41 and 42 and the seat is supported thereby. As is indicated in FIGURE 4 of the drawings, the seat 37 is provided with downwardly projecting dowels 43 along the edges 39 and 40 which are designed to fit into sockets 44 in the upper surfaces of the frame strips 41 and 42. When in place, the seat 37 thus holds the two panels 12 and 17 in right angular relation.

A pair of floor panels 45 and 46 are provided with right angular edges 47 and 49, the edges 47 extending along the bottom frame strips 15 and 21 of the two sections, and the edges 49 extending at right angles to the outer edges of the sections. The two panels 45 and 46 abut together along a diagonal edge 50 of each section and the ends of the panels are cut away as indicated at 51 to avoid interference with ice or snow which might become wedged between the two sections. The edges 52 of the bottom panels 45 and 46 which are parallel to the edges 47 thereof, define a right angular notch in the corner of the shelter most remote from the seat 37 to expose a hole in the ice which is indicated by the dotted line 53.

The panel 12 is provided with a pair of spaced pegs or dowels 54 which project normally from the panel 12. A pair of spaced apertures 55 are provided in the seat panel 37, and a similarly spaced pair of apertures 56 are provided in each of the floor panels 45 and 46. The apertures 55 and 56 are spaced apart a distance equal to the spacing between the pegs or dowels 54, and are designed to accommodate the pegs. When the shelter is collapsed, the floor panels 45 and 46 and the seat 37 are slipped over the pegs 54 for storage purposes. The seat 37 is preferably positioned outermost in view of the right angularly projecting dowels 43.

A heater 57 is mounted in a generally rectangular frame 59 projecting inwardly from the panel 17, and a drawer 60 is slidably supported in the lower portion of the frame 59 for the storage of fishing tackle and the like. An ice auger 61 is secured to the lower portion of the panel 17 by suitable restraining straps or clips 62 and 63 and a short fish pole 64 is attached to the frame strip 19 by suitable brackets 65. Thus the shelter when collapsed is capable of accommodating all of the equipment usually used for ice fishing purposes.

The flexible covering used to complete the enclosure has been omitted in FIGURE 3 of the drawings in order to disclose the interior construction of the shelter. This flexible closure is supported as best illustrated in FIGURES 5 through 12 of the drawings. The closure is provided with a generally pyramidal top 66 having four generally triangular panels when in erected form although in the form illustrated the top is formed by slitting a sheet of the material to the center point, removing a triangular wedge and securing the cut edges back together. This procedure forms a cone which may be flexed into pyramidal shape when the edges are cut properly. The seam in the top panel 66 extends from the center of the top to the hinge line of the sections 10, 11, the seam being indicated in FIGURE 6 by the numeral 67. If desired, a ventilation opening 69 may be provided at the center of the top.

The top 66 is secured along two edges to the braces 16 and 22 by tacks 70 or other suitable means. The outer walls 71 and 72 which depend downwardly in right angular relation from the rectangular top 66 are supported by a brace 73. The brace 73 extends along the seams 74 and 75 connecting the top 66 to the panels 71 and 72.

As indicated in FIGURE 11 of the drawings, the brace 73 comprises a pair of elongated dowels 76 having their ends extending into and attached to a flexible coil spring 77. The coil spring 77 is sufficiently flexible to permit the dowels 76 to swing from parallel relation to right angular relation illustrated in FIGURE 11. As indicated in FIGURES 8 and 9 of the drawings, a strip 79 of flexible metal, plastic, or other suitable material is inserted into a slot 80 in the outer end of each dowel 76 and is secured in place by screws 81 or other suitable means. The free end of the strip 79 is secured by a bolt 82 to a corresponding section 10 or 11 as will be later described in more detail. One dowel 76 is secured to section 10 near the frame strip 13, and the other dowel 56 is secured to the section 11 near the frame strip 20.

A second supporting frame 83 extends diagonally across the top of the two sections and converges upwardly to hold the top 66 in pyramidal form. The brace 83 is similar in construction to the brace 73 and includes a pair of dowels 84 having their inner ends connected by a coil spring 85. Flexible straps 86 are anchored in slots 87 in the outer ends of the dowels 84 and these straps 86, like the straps 79, are perforated to accommodate the bolt 82. As is best illustrated in FIGURES 8 and 9 of the drawings, the bolt 82 extends through the outer panel such as 17, the upper brace such as 22, and through the straps 79 and 86, the ends of the straps being supported between spacing washers 89, and the parts being held assembled by the nut 90 on the bolt 82.

A cord or string 91 is attached to the spring 85 between the dowels 84 and may be connected to the spring 77 between the dowels 76 and to one of the sections at the hinge joint therebetween. This string is designed to hold the brace 83 intermediate the hinge corner between the sections and the opposite corner of the flexible enclosure. The flexible enclosure may be secured to the dowels 76 and 84 in any suitable manner such as by ties 92. The brace 83 and the string 91 define the juncture between the triangular panels forming the top 66 and hold the panels 71 and 72 at right angles when the shelter is erected.

As is indicated in FIGURES 5 and 9 of the drawings, the braces 73 and 83 are folded back into a position parallel to the panels 12 and 17 to which they are attached when the shelter is to be collapsed. When the sections are swung together, the springs 77 and 85 flex to permit the dowels 76 and 84 to swing into parallel relation between the sections. A bottom brace 93 is also provided, the brace 93 also including a pair of dowels 94 centrally connected by a coil spring 95. The brace 93 may be enclosed in a hem 96 at the lower edge of the panels 71 and 72 as indicated in FIGURE 10. The ends of the dowels 94 are provided with projecting axial shanks 97 having heads 99 at their outer extremities. As indicated FIGURES 3 and 12, blocks 100 are secured to the sections 10 and 11 at the juncture between the frame members 13 and 15 and at the juncture between the frame members 20 and 21. The blocks 100 are provided with apertures in their ends, not illustrated in the drawings which are covered by cover plates 101, having keyhole shaped slots 102 therein. The plates 101 are secured in place by screws 103 or other suitable means. The lower frame 93 is engaged by stretching the closure panels 71 and 72 downwardly until the heads 99 of the shanks 97 extend through the slots 102, and the release of the downward pressure permits the shanks 97 to move upwardly a distance sufficient to engage the smaller end of the key-hole shape slots.

As indicated in FIGURE 9, sockets 104 are provided on the inner surfaces of the frame strips 13 and 20 of the sections 10 and 11, and these apertures are covered by keyhole shaped plates 105 similar to the plates 101. The plates 105 are arranged at right angles to the plates 101 and may be near the upper ends of the frame strips. When the shelter is collapsed, the lower frame 93 is detached from the plates 101, and is flexed in the opposite direction so that the dowels 94 extend parallel to the panels 12 and 17 of the sections to which they are attached. When the sections are folded together, the connecting spring 95 flexes to permit the dowels to swing into parallel relation. As is indicated in FIGURE 5 of the drawings, the flexible closure may then be bunched together and secured to the two sections by means of straps 107.

The operation of the shelter is believed obvious from the foregoing description. When the proper location is reached, the sections may be swung apart by swinging the enclosure 30 out of position and detaching the clasp 24 and swinging the sections 10 and 11 into right angular relation. At this point or later, a hole may be dug through the ice. The seat 37 is removed from the pegs 54 and attached in place, the dowels 43 engaging in the sockets 44 in the cross braces 41 and 42. The floor boards 45 and 46 may be placed upon the ice. The flexible curtain may then be unfolded by detaching the straps 107, and swinging the braces 73 and 83 into proper position. The bottom brace 93 is then put into place connecting the lower ends of the section, and the shelter is assembled. The shelter may be collapsed by the reversal of this process.

In accordance with the patent statutes, I have described the principles of construction and operation of my improvement in Collapsible Ice Fishing Shelter, and while I have endeavored to set forth the best embodiment thereof, I desire to have it understood that changes may be made within the scope of the following claims without departing from the spirit of my invention.

I claim:
1. A portable collapsible shelter including,
   a pair of similar sections hingedly connected for movement from parallel relation to right angular relation,
   each said section including a four sided wall panel having framing strips extending along three of the four side edges thereof adapted to abut when said sections are parallel to form a hollow enclosure between said wall panels,
   a closure member hinged to the fourth edge of one section and adapted to provide a closure for the fourth side of said sections in one pivotal position thereof,
   a flexible curtain including a top member of generally rectangular outline secured along two adjacent edges to said fourth edge thereof,
   said curtain including a pair of connected wall panels secured to and dependable from the remaining two adjoining edges of said top member, and
   brace means engageable with said flexible curtain along said remaining two adjoining edges of said top member and connected to said sections at the edges thereof most remote from the hinge connection therebetween to support said curtain.
2. The structure of claim 1 and including a pair of spaced parallel runner projecting from one edge of said sections when said sections are parallel.
3. The structure of claim 1 and in which said brace means includes two braces, each brace including a pair of rods having a coil spring encircling an end thereof and forming a flexible connection between the ends thereof, and
   flexible means hingedly connecting the other end of each rod to a corresponding section,
   one of said braces being foldable from a position in which said rods are generally parallel to the section to which they are attached to a position normal thereto, and
   the other of said braces being foldable from a position in which said rods are generally parallel to the section to which they are attached to a position extending diagonally between the edges of said sections most remote from the hinge connection between said sections and with the rods thereof in upwardly converging relation.
4. The structure of claim 3 and including a flexible connecting means extending from the center of said other brace to the center of said one brace and to the hinged edge of one said section.
5. The structure of claim 1 and including a seat, and means detachably connecting each end of said seat to a corresponding section, said seat being supported between said sections.
6. The structure of claim 1 and including spaced parallel pegs extending inwardly from the wall panel of one section,
   a detachable seat extendable between said sections for support thereby.
   said seat having spaced openings therethrough spaced to accommodate said pegs.
7. The structure of claim 6 and including a pair of floor panels having openings therethrough spaced to accommodate said pegs.
8. A fishing shelter including,
   a pair of substantially rigid sections hinged together to fold from side by side relation to right angular relation,
   a flexible curtain including a top of generally rectangular outline secured along two adjoining edges to the upper portions of said sections and having depending panels attached to the other two adjoining edges, and
   curtain supporting means secured to said sections and extending in angular relation adjacent to the junction between said curtain top and said depending panels,
   said curtain supporting means including a pair of rods each having one end detachably secured to and extending substantially normally from, the outer edge of a corresponding one of said sections, and means connecting the other ends of said rods together.
9. A fishing shelter including,
   a pair of substantially rigid sections hinged together to fold from side by side relation to right angular relation,
   a flexible curtain including a top of generally rectangular outline secured along two adjoining edges to the upper portions of said sections and having depending panels attached to the other two adjoining edges, and
   curtain supporting means secured to said sections and extending in angular relation adjacent to the junction between said curtain top and said depending panels,
   said curtain top being of pyramidal form and including a top supporting brace extending diagonally between the free ends of said sections in upwardly converging relation.
10. A fishing shelter including,
    a pair of substantially rigid sections hinged together to fold from side by side relation to right angular relation, a flexible curtain including a top of generally rectangular outline secured along two adjoining edges to the upper portions of said sections and having depending panels attached to the other two adjoining edges, and curtain supporting means secured to said sections and extending in angular relation adjacent to the junction between said curtain top and said depending panels, said curtain supporting means comprising a pair of rods, and a coil spring encircling the ends of said rods and forming a flexible means connecting the other ends of each said rod to a corresponding section.

References Cited by the Examiner
UNITED STATES PATENTS

| | | | |
|---|---|---|---|
| 104,245 | 6/70 | Armstrong et al. | 135—7.1 |
| 2,465,147 | 3/49 | Butler et al. | |
| 2,546,588 | 3/51 | Ellis | 135—4 X |
| 2,632,454 | 3/53 | Skogen | 135—4 |
| 2,717,160 | 9/55 | Schmidt et al. | 135—4 X |

FOREIGN PATENTS 813,749 5/59 Great Britain.

BENJAMIN BENDETT, *Primary Examiner.*